United States Patent
Sheldon et al.

(10) Patent No.: US 8,140,521 B1
(45) Date of Patent: Mar. 20, 2012

(54) PERFORMING SQL QUERY OPTIMIZATION BY SIMPLIFYING SUB-EXPRESSIONS

(75) Inventors: Stephen Fife Sheldon, Seattle, WA (US); Arthur Vargas Lopes, San Diego, CA (US); Grace Kwan-On Au, Rancho Palos Verdes, CA (US); Ahmad Said Ghazal, Redondo Beach, CA (US)

(73) Assignee: Teradata US, Inc., Dayton, OH (US)

( * ) Notice: Subject to any disclaimer, the term of this patent is extended or adjusted under 35 U.S.C. 154(b) by 1904 days.

(21) Appl. No.: 10/800,493

(22) Filed: Mar. 15, 2004

(51) Int. Cl.
*G06F 7/00* (2006.01)
(52) U.S. Cl. .......................... 707/716; 707/797
(58) Field of Classification Search .............. 707/4, 716, 707/979
See application file for complete search history.

(56) References Cited

U.S. PATENT DOCUMENTS

| | | | | |
|---|---|---|---|---|
| 5,590,324 A | * | 12/1996 | Leung et al. | 707/5 |
| 6,618,719 B1 | * | 9/2003 | Andrei | 707/2 |
| 6,665,664 B2 | * | 12/2003 | Paulley et al. | 707/4 |

OTHER PUBLICATIONS

Esko Nuutila, "Transitive Closure", Helsinki University of Technology, Oct. 9, 1995, http://www.cs.hut.fi/~enu/tc.html.*
Esko Nuutila, "Transitive Closure," Helsinki University of Technology, Oct. 9, 1995, <http://www.cs.hut.fi/~enu/tc.html>.*

* cited by examiner

*Primary Examiner* — Cheyne Ly
(74) *Attorney, Agent, or Firm* — Howard Speight

(57) ABSTRACT

A method, computer program, and database system are disclosed for processing a database query that includes one or more expressions. The method includes resolving columns in one or more of the expressions. Expression optimization is performed on one or more of the expressions. Afterward, further query optimization is performed.

27 Claims, 14 Drawing Sheets

PERFORMING SQL QUERY OPTIMIZATION BY SIMPLIFYING SUB-EXPRESSIONS

BACKGROUND

SQL queries, particularly, but not limited to, those that are automatically generated may contain many expressions, some of which can have no effect on the return value of the query. However, conventional database system process many, if not all, of the expressions as part of the query. Such processing can burden the database system's resources.

SUMMARY

In general, in one aspect, the invention features a method of processing a database query. The database query includes one or more expressions. The method includes resolving columns in one or more of the expressions; performing expression optimization on one or more of the expressions; and performing further query optimization. The expression optimization is performed before further query optimization.

Implementations of the invention may include one or more of the following. Each expression may include one or more sub-expressions. Expression optimization may include, for each expression that has a form selected from the group of "SE+0," "SE*1," and "SE/1," where SE is a sub-expression, reducing the expression to SE. Expression optimization may include, for each expression that has a form selected from the group of "SE*0," "0/SE," and "0 MOD SE," where SE is a non-nullable sub-expression, reducing the expression to 0. Expression optimization may include, for each expression that has a form F(C), where F is a function and C is a constant and F(C) returns the return value, reducing the expression to a return value. The method may include, for each sub-expression that includes a sub-expression, simplifying the sub-expression. SE may be nullable if it includes a nullable column. SE may be nullable if it belongs to an inner table of an outer join. The query may be represented by a tree that includes one or more nodes. The query may include an assignment list clause that includes one or more of the expressions. The query may include a WHERE clause that includes one or more of the expressions. Further query optimization may include determining a satisfiability of the database query. Further query optimization may include determining a transitive closure of the database query. Further query optimization may include determining one or more plans for executing the query. One or more of the plans may include scanning a table to locate rows that satisfy one or more conditions and summing one or more columns in the rows that satisfy the one or more conditions. Further query optimization may include two or more optimizations selected from: determining a satisfiability of the database query; determining a transitive closure of the database query; determining one or more plans for executing the query; and selecting an optimal plan for executing the database query.

In general, in another aspect, the invention features a computer program, stored on a tangible storage medium, for use in processing a database query. The query includes one or more expressions. The computer program includes executable instructions that cause a computer to: resolve columns in one or more of the expressions; perform expression optimization on one or more of the expressions; perform further query optimization. The expression optimization is performed before further query optimization.

In general, in another aspect, the invention features a database system that includes a massively parallel processing system. The massively parallel processing system includes one or more nodes; a plurality of CPUs, each of the one or more nodes providing access to one or more CPUs; a plurality of data storage facilities each of the one or more CPUs providing access to one or more data storage facilities; and a process for execution on the massively parallel processing system for processing one or more database queries. Each query includes one or more expressions. The process includes resolving columns in one or more of the expressions;

performing expression optimization on one or more of the expressions; performing further query optimization. The process performs expression optimization before further query optimization.

DETAILED DESCRIPTION

Figure 1:
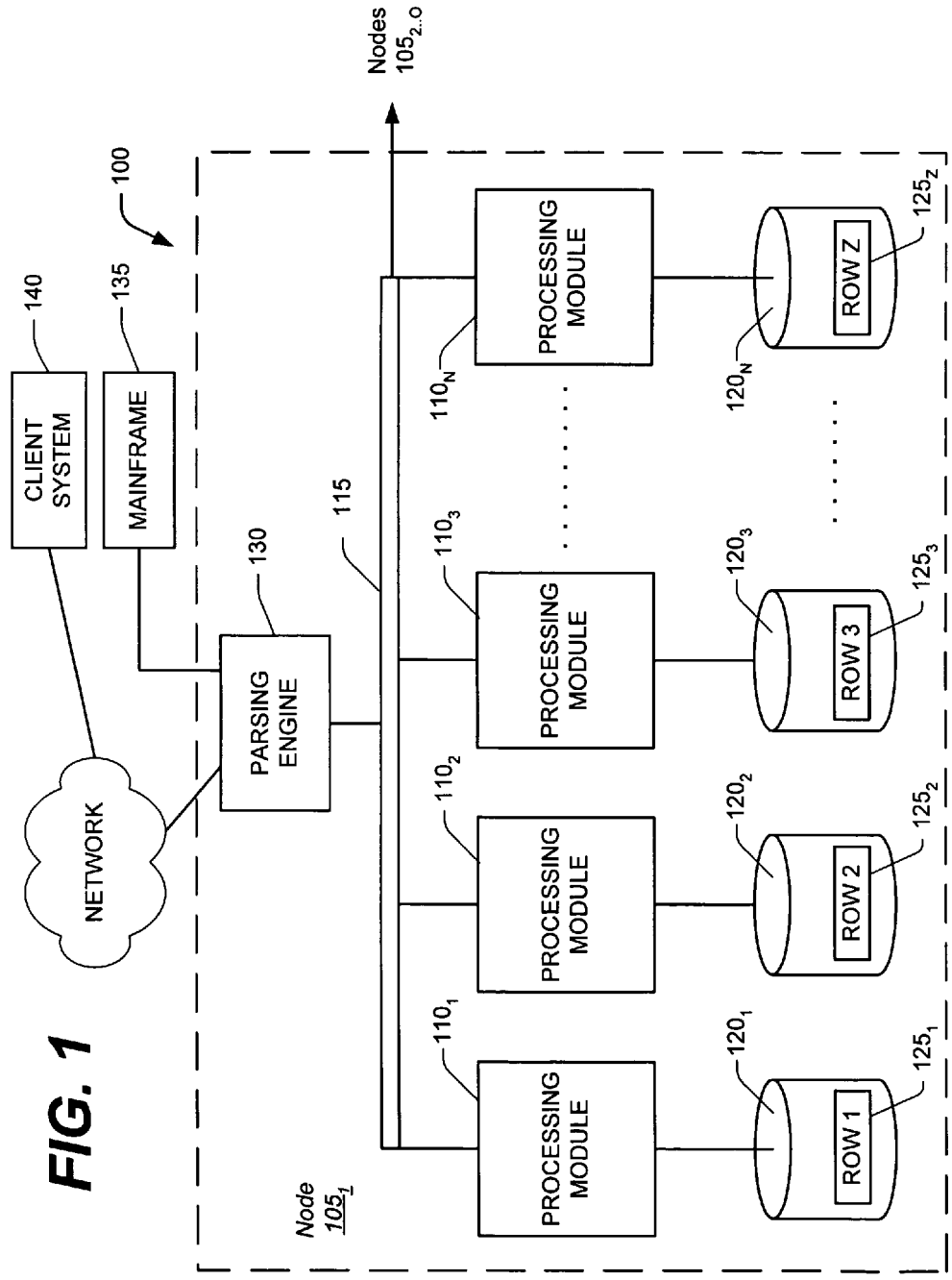
FIG. 1 is a block diagram of a node of a database system.

The techniques for processing database queries disclosed herein have particular application, but are not limited, to large databases that might contain many millions or billions of records managed by a database system ("DBS") 100, such as a TERADATA ACTIVE DATA WAREHOUSING SYSTEM available from TERADATA CORPORATION. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots O}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_1 \ldots z$ among the processing modules $110_1 \ldots N$. The parsing engine 130 also coordinates the retrieval of data from the data-storage facilities $120_1 \ldots N$ in response to queries received from a user at a mainframe 135 or a client computer 140. The DBS 100 usually receives queries and commands to build tables in a standard format, such as SQL.

In one implementation, the rows $125_1 \ldots z$ are distributed across the data-storage facilities $120_1 \ldots N$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to data-storage facilities $120_1 \ldots N$ and associated processing modules $110_1 \ldots N$ by a hash bucket map. The characteristics of the columns chosen for the primary index determine how evenly the rows are distributed.

Figure 2:
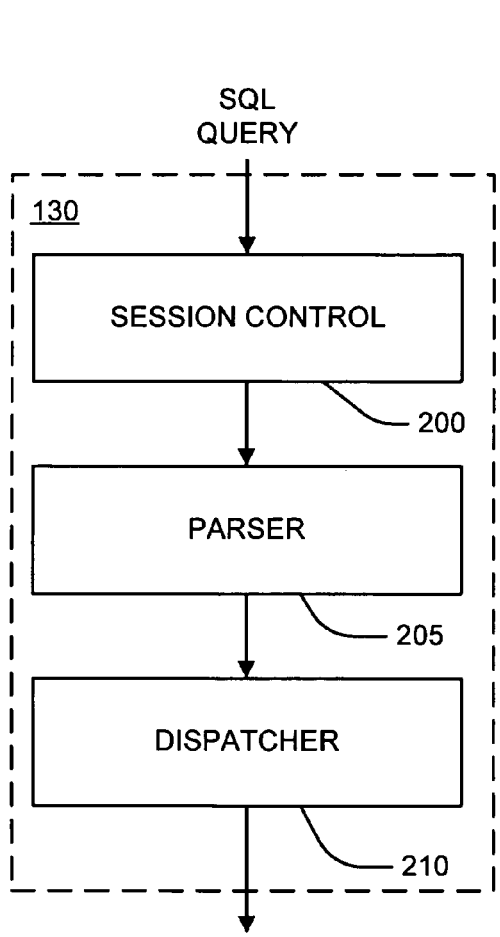
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
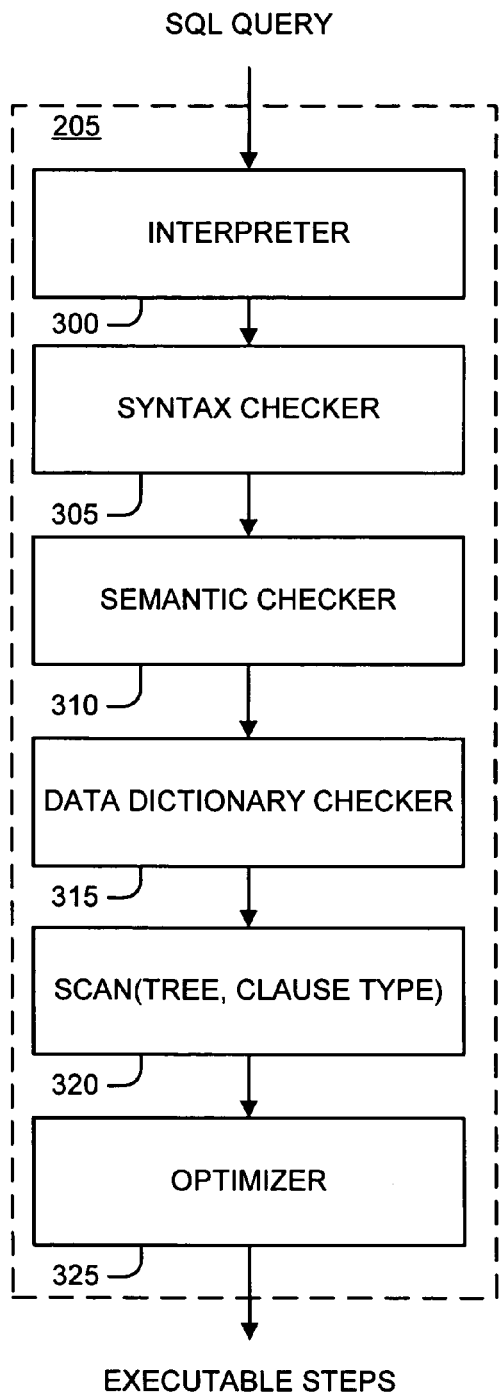
FIG. 3 is a flow chart of a parser.

Once the session control 200 allows a session to begin, a user may submit a SQL query, which is routed to the parser 205. As illustrated in FIG. 3, the parser 205 interprets the SQL query (block 300), checks it for proper SQL syntax (block 305), evaluates it semantically (block 310), and consults a data dictionary to ensure that all of the objects specified in the SQL query actually exist and that the user has the authority to perform the request (block 315). Next, the parser 205 calls the scan function (block 320, which is shown in greater detail in FIG. 5), passing the current expression tree and expression type to the scan function. Finally, the parser 205 runs an optimizer (block 325), which develops the least expensive or optimal plan to perform the SQL query. In certain implementations, the optimizer (block 325) determines the satisfiability of the SQL query. In other implementations, the optimizer (block 325) determines the transitive closure of the SQL query. In other implementations, the optimizer (block 325) generates one or more plans for executing the SQL query and, from these plans, chooses the optimal plan. One example plan for executing the SQL query includes scanning all rows in a table to determine which rows satisfy one or more conditions (e.g., that a column is not null) and summing one or more columns in each of the rows that satisfy the one or more conditions.

Figure 4A:
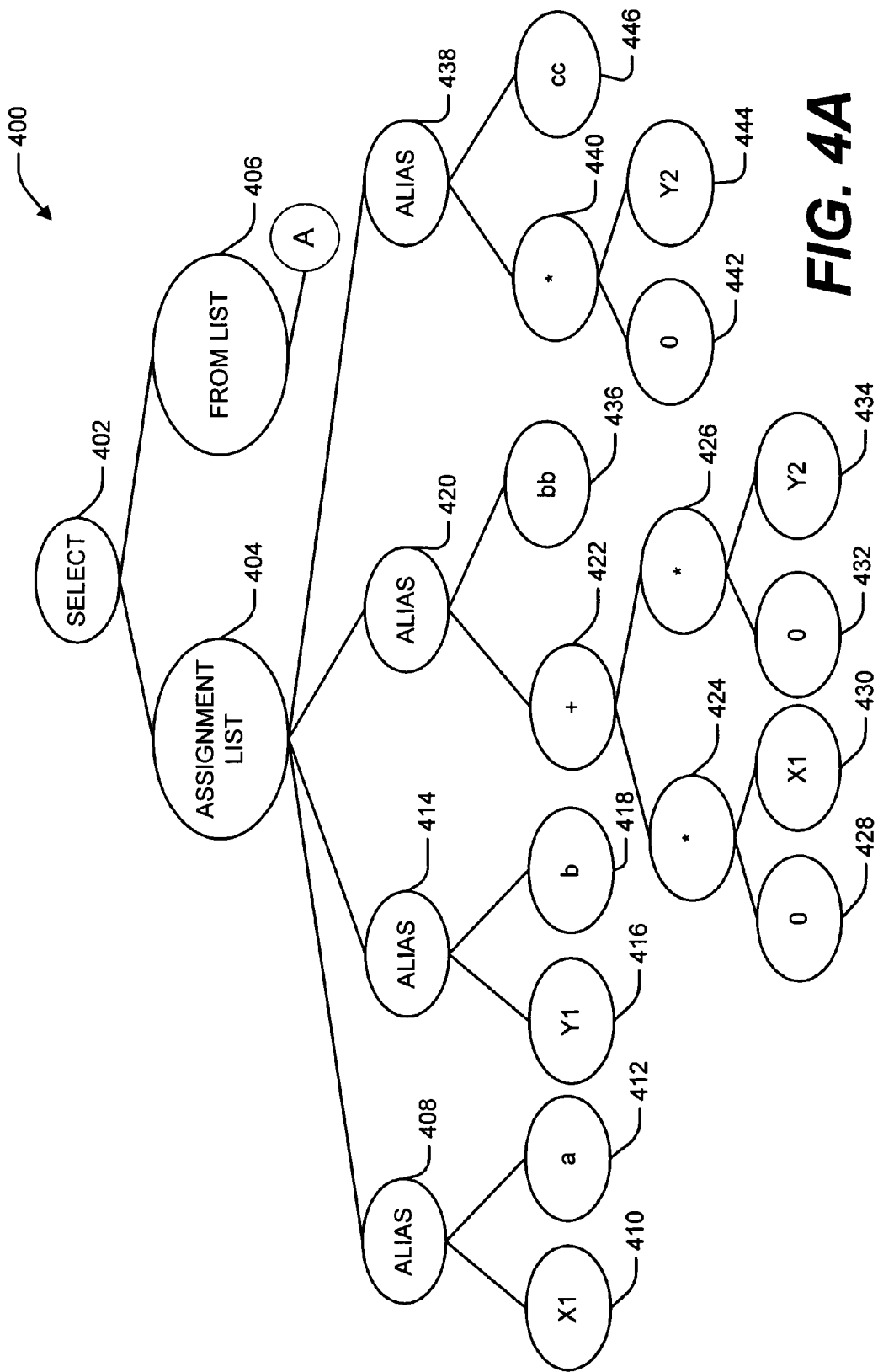
FIGS. 4A and 4B are a tree diagram of a SQL query.

In one example parser 205, the SQL query is represented in a tree structure for processing. Each clause of the SQL query, each expression within each clause, and each sub-expression within each expression is represented in the tree structure. An example of such a tree is shown generally at 400 in FIGS. 4A and 4B. The tree 400 is created in response to the following table definitions and SQL query:

CREATE TABLE ta1 (x1 INT NOT NULL, y1 NT, z1 INT);
CREATE TABLE ta2 (x2 NT NOT NULL, y2 NT NOT NULL, z2 INT NOT NULL);
SELECT x1 a, y1 b, 0*x1+0*y2 bb, z2*0 cc FROM ta1 LEFT OUTER JOIN ta2 ON x1=x2;

As shown in FIG. 4A, the tree created by the parser 205 in response to the above SQL query has a SELECT node 402 as its root. The children of the SELECT node 402 are an assignment list node 404 and a FROM list node 406. The assignment list node 404, and its descendents represent the assignment list of the SQL query. The first child of assignment list node 404 is alias node 408 which, in turn, has child nodes 410 (representing "X1") and 412 (representing "a"). Similarly, alias node 414 has child nodes 416 (representing "Y1") and 418 (representing "b"). Alias node 420 and its descendants represent "0*x1+0*y2 bb" with addition node 422, multiplication nodes 424 and 426, and nodes 428 (representing "0"), 430 (representing "X1"), 432 (representing "0"), 434 (representing Y2), and 436 (representing "bb"). Similarly, alias node 438 and its children represent "z2*0 cc" with multiplication node 440, and nodes 442 (representing "0"), 444 (representing "Y2"), and 446 (representing "cc").

Figure 4B:
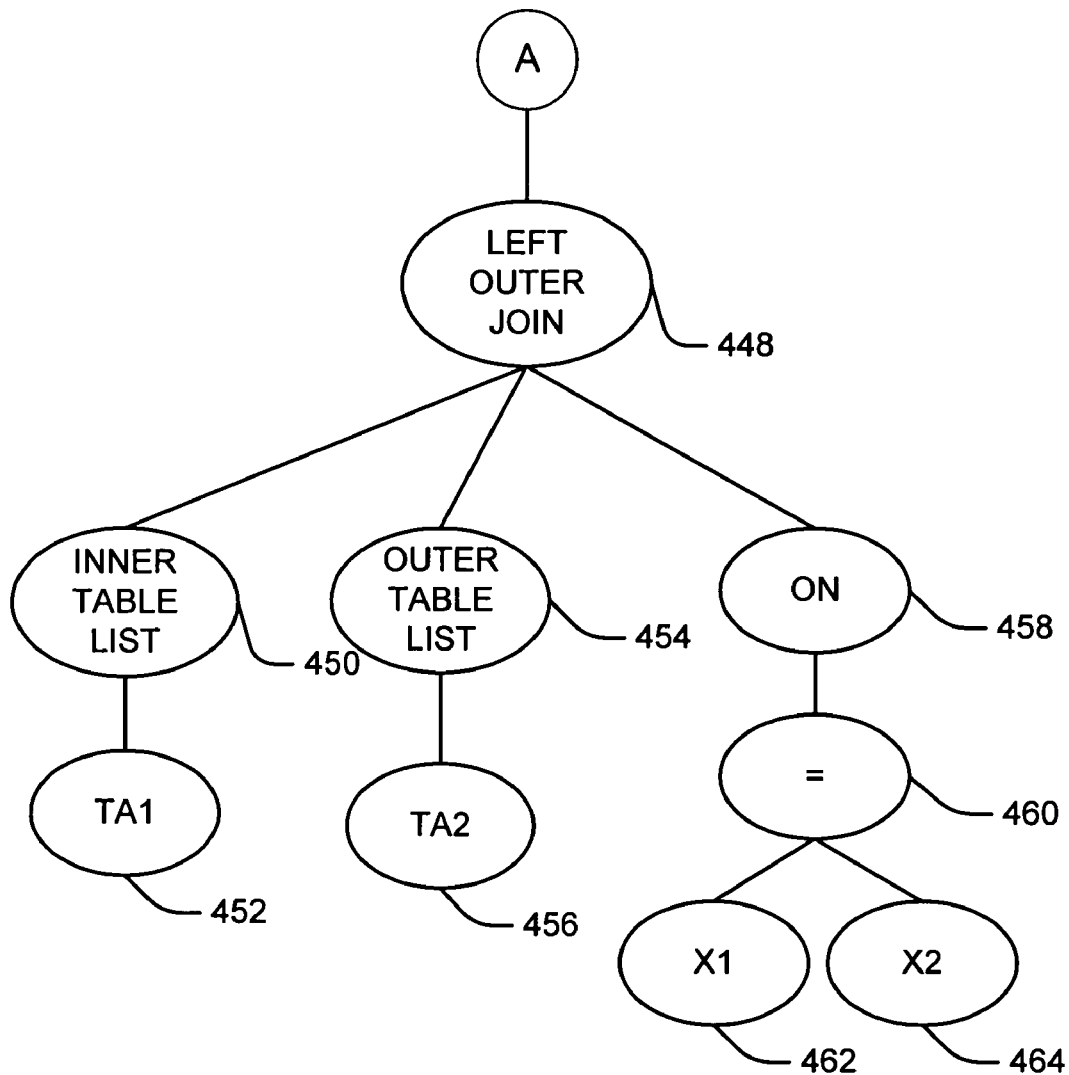

The children of the FROM list node 406 are shown in FIG. 4B. The FROM clause "ta1 LEFT OUTER JOIN ta2 ON x1=x2" is represented by the parser 205 as the tree defined by LEFT OUTER JOIN node 448 and its children. The first child node, inner table list node 450 has a child node 452 (representing "TA1"). The next child node outer table list 454 has a child node 456 (representing "TA2"). Finally, ON node 458 has child equal node 460, which, in turn, has child nodes 462 (representing "X1") and 464 (representing "X2").

Figure 5:
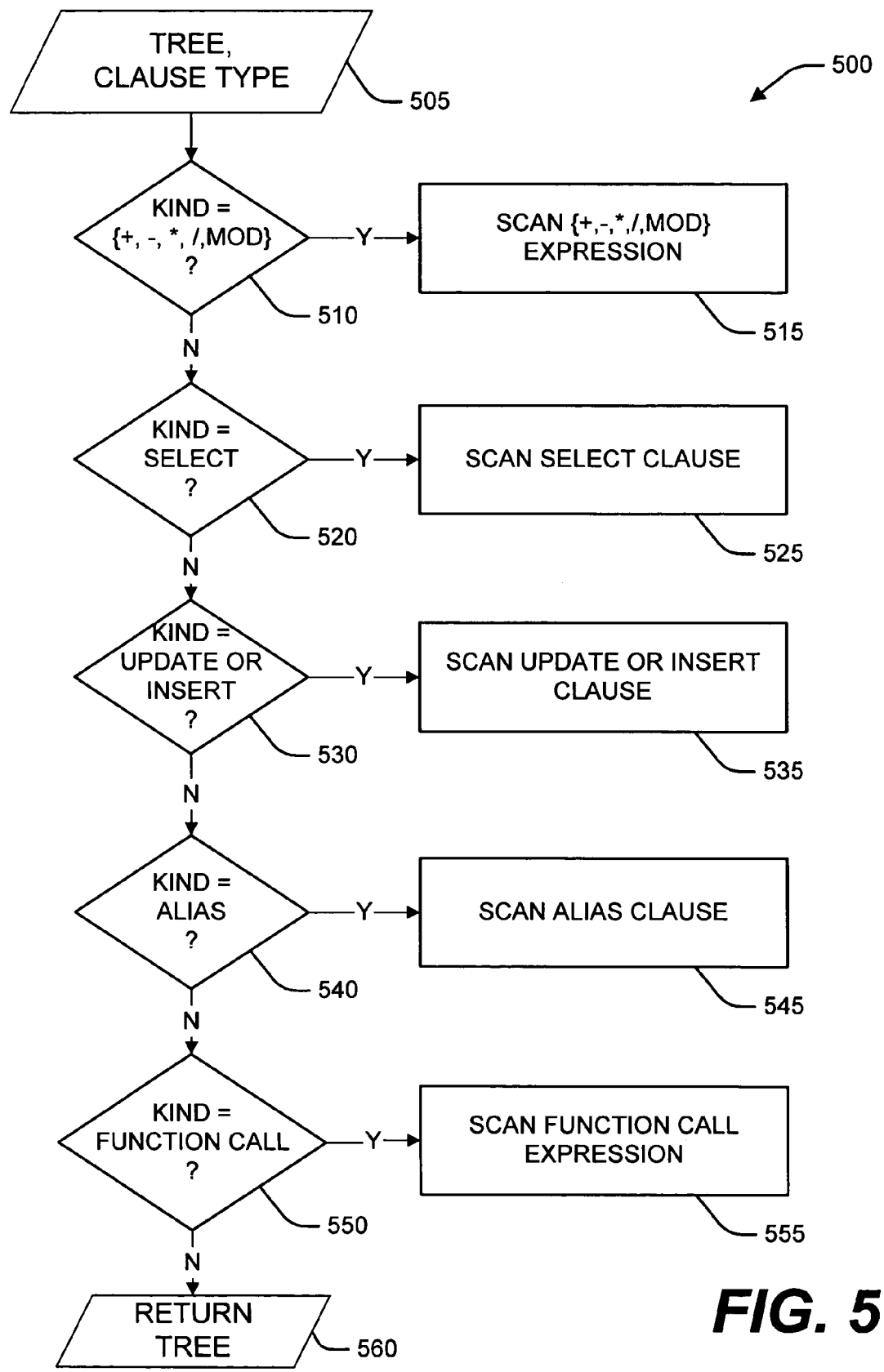
FIGS. 5-10 are flow charts of a system for scanning the SQL query.

FIG. 5 shows an example system for scanning the SQL query to find expressions that may be simplified (block 320). The system receives a tree representing all or a portion of a SQL query and a value CLAUSE representing the position of the root node of the tree in the SQL query (block 505). In one example system the tree is passed by reference (e.g., a pointer to the tree is passed to the function). The system determines if the tree kind is addition, subtraction, multiplication, division, or modulo (e.g. the root node of the tree is one of these types of nodes) and, if so, it scans the addition, subtraction, multiplication, division, or modulo expression (block 515, which is shown in greater detail in FIG. 6). Otherwise, the system determines whether the tree kind is SELECT (e.g. the root node of the tree is a SELECT node), and, if so, it scans the SELECT clause (block 525, which is shown in greater detail in FIG. 7). Otherwise, it determines if the tree kind is UPDATE or INSERT (e.g. the root node of the tree is an UPDATE or INSERT node), and, if so, it scans the update clause (block 535, which is shown in greater detail in FIG. 8). Otherwise, it determines if the tree kind is alias (e.g. the root node of the tree is an alias node), and, if so, it scans the alias clause (block 545, which is shown in greater detail in FIG. 9). Otherwise, it determines if the tree kind is function call (e.g., the root node of the tree is a function call node), and, if so, it scans the function call expression (block 555, which is shown in greater detail in FIG. 10). Otherwise, the system returns the tree (block 560).

An example algorithm for implementing the scanning system (block 320) is disclosed below. The ExpPrune procedure and the Eval procedure are discussed in more detail below with example computer algorithm. In the following procedure, Tree represents the SQL query or sub-query tree, and Clause represents the clause where the SQL query or sub-query is located. The procedure returns a tree representing the simplified SQL query or sub-query.

Figure 6:
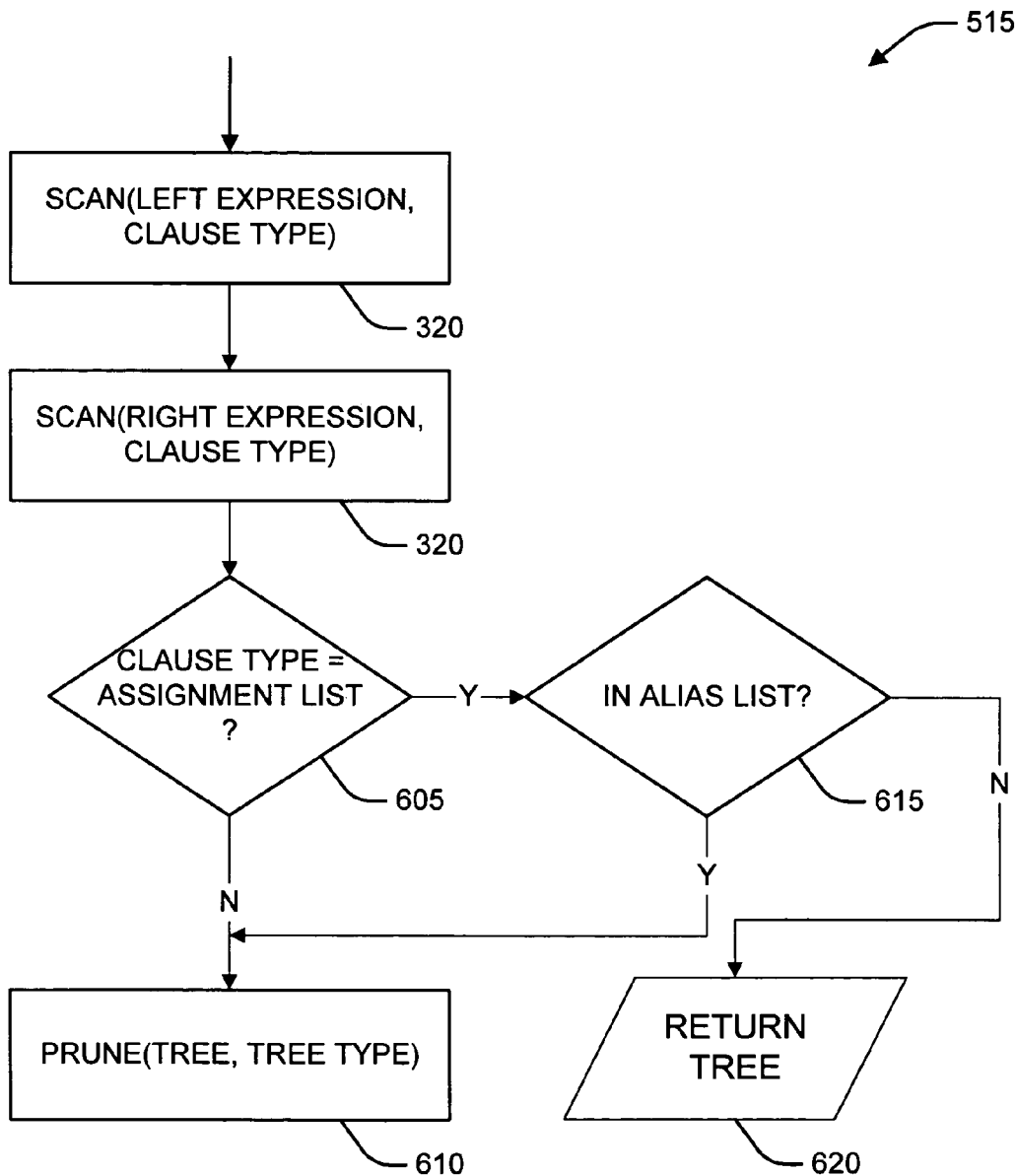

PROCEDURE Scan(Tree,Clause);
BEGIN
    When Tree's Kind is equal to ParRet=>—process a select statement
    Call Push(CurrentRet,Tree);
    Call Scan(Assignment List of Tree, AssignmentList);
    Call Scan(Where clause of Tree,Where);
    Call Scan with other clauses;
    Call Pop(CurrentRet, Tree);
    When Tree's Kind is equal to Parinsert=>—process an insert statement
    Call Scan(Values clause of Tree,InsertList);

If it is an InsertSelect then
    Call Scan(InsSelect clause of Tree,Select);
When Tree's Kind is equal to ParUpdate=>—process an update statement
    Call Scan(Set clause of Tree,UpdateList);
    Call Scan with other clauses;
When Tree's Kind is equal to ParAdd, ParSub, ParMult, ParDiv=>process +, −, *, / and Mod terms
    Call Scan(Left expression of Tree,Clause);
    Call Scan(Right expression of Tree,Clause);
    If Clause equals to AssignmentList then
        If WithinConv>0 then
            Tree<=ExpPrune(Tree, Top(CurrentRet));
        Else
            Tree<=ExpPrune(Tree, Top(CurrentRet));
When Tree's Kind is equal to ParConv=>process an alias clause
    WithinConv +=1;
    Call Scan(Left expression of Tree,Clause);
    Call Scan(Right expression of Tree,Clause);
    WithinConv −=1;
When Tree's Kind is equal to ParFunctionCall=>process a function call
    Call Scan(Function name of Tree, Clause);
    Call Scan(Parameter list of Tree, Clause);
    If Parameter list of Tree contains constants then
        Tree<=Eval(Function name of Tree, Parameter list of Tree);
END FIG. 6 shows an example system for scanning an addition, subtraction, multiplication, division, or modulo expression trees (block 515). The system calls the scan function (block 320) and passes the left tree (e.g., the tree whose root is the left child of the current node, including the left child's descendants) and the clause type to the scan function. Then, the system calls the scan function (block 320) and passes the right tree (e.g., the tree whose root is the right child of the current node, including the right child's descendants) and the clause type to the scan function. Then, if the clause type is an assignment list (block 605) and the expression is not within an alias list (block 615), the system returns the tree (block 620). One example system determines whether it is in an assignment list by incrementing a "WithinConv" count by one each time the system enters an alias clause, and decrementing the "WithinConv" count each time the system exits an alias clause. Otherwise the system calls a prune function (block 610, which is shown in greater detail in FIGS. 11A and 11B) and passes the function the tree and the "CurrentRet" variable (discussed below with respect to FIG. 5). In certain implementations the tree and other variables are passed by reference.

Figure 7:
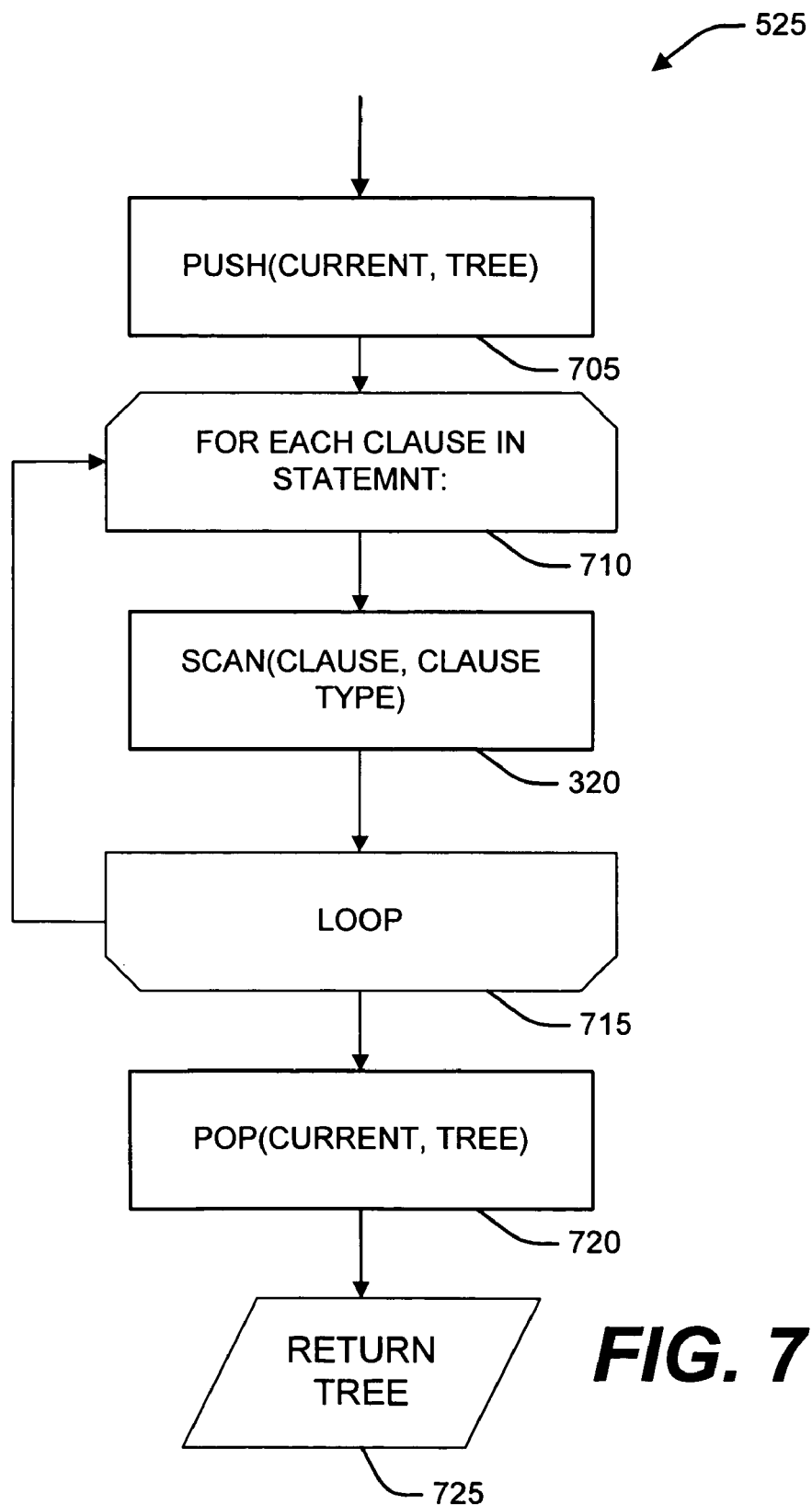

FIG. 7 shows an example system for scanning a SELECT clause tree (block 525). The system begins by pushing the tree onto the stack referenced by the variable name "CurrentRet" (block 705). This variable will give other portions of the system access to the entire SELECT clause tree when they are evaluating an expression or a sub-expression within the SELECT clause tree. The system then loops once for each clause in the statement (blocks 710 and 715). Within the loop, the system calls the scan function (block 320) and passes the tree corresponding to the clause and the clause type to the scan function. After exiting the loop, the system pops the tree referenced by the variable "CurrentRet" off of the stack. The system then returns the tree (block 725).

Figure 8:
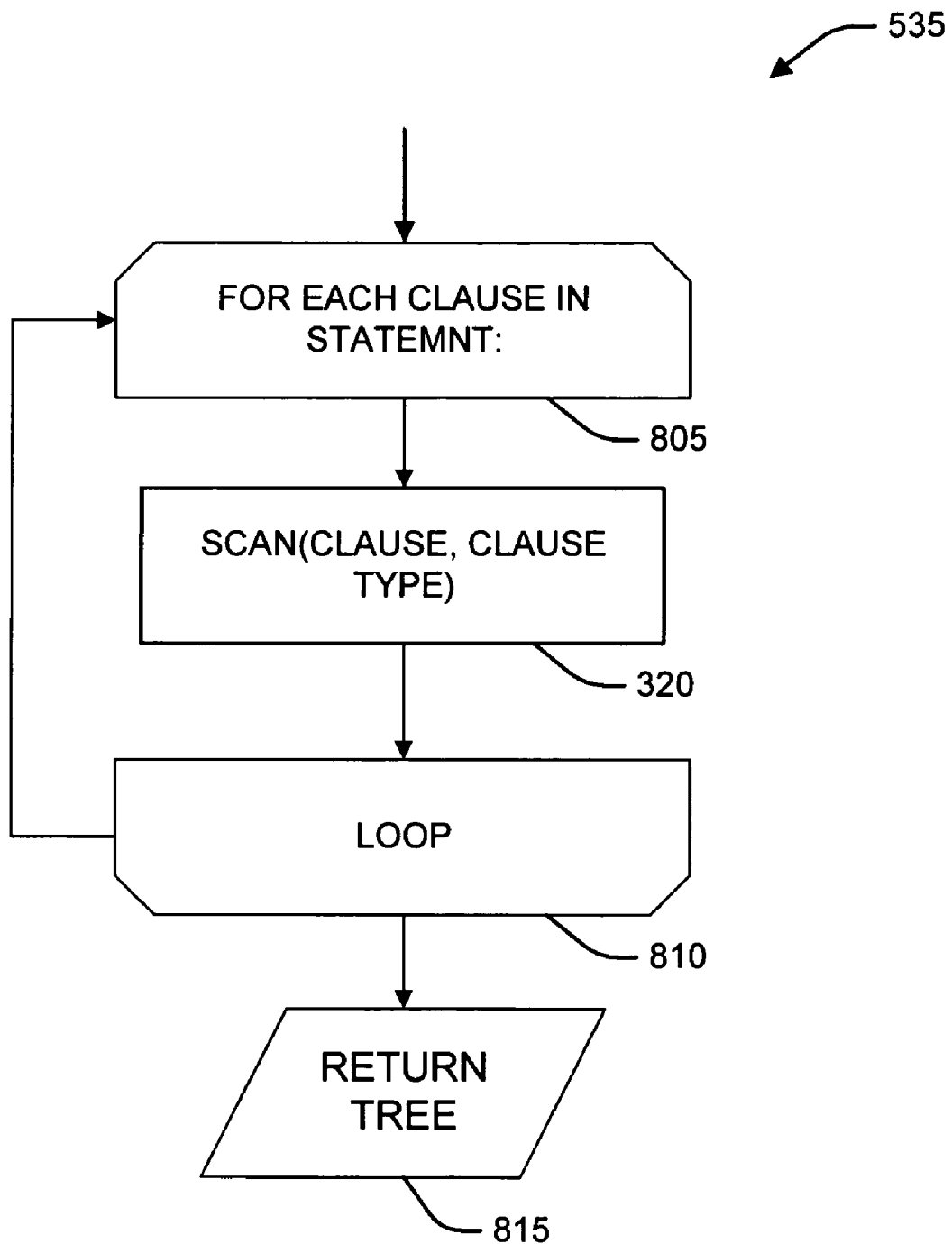

FIG. 8 shows an example system for scanning an INSERT or UPDATE statement tree (block 535). The loops once for each clause in the statement (block 805 and 810). Within the loop the system calls the scan function (block 320) and passes the tree representing the clause and the clause type. After exiting the loop, the system returns the tree (block 815).

Figure 9:
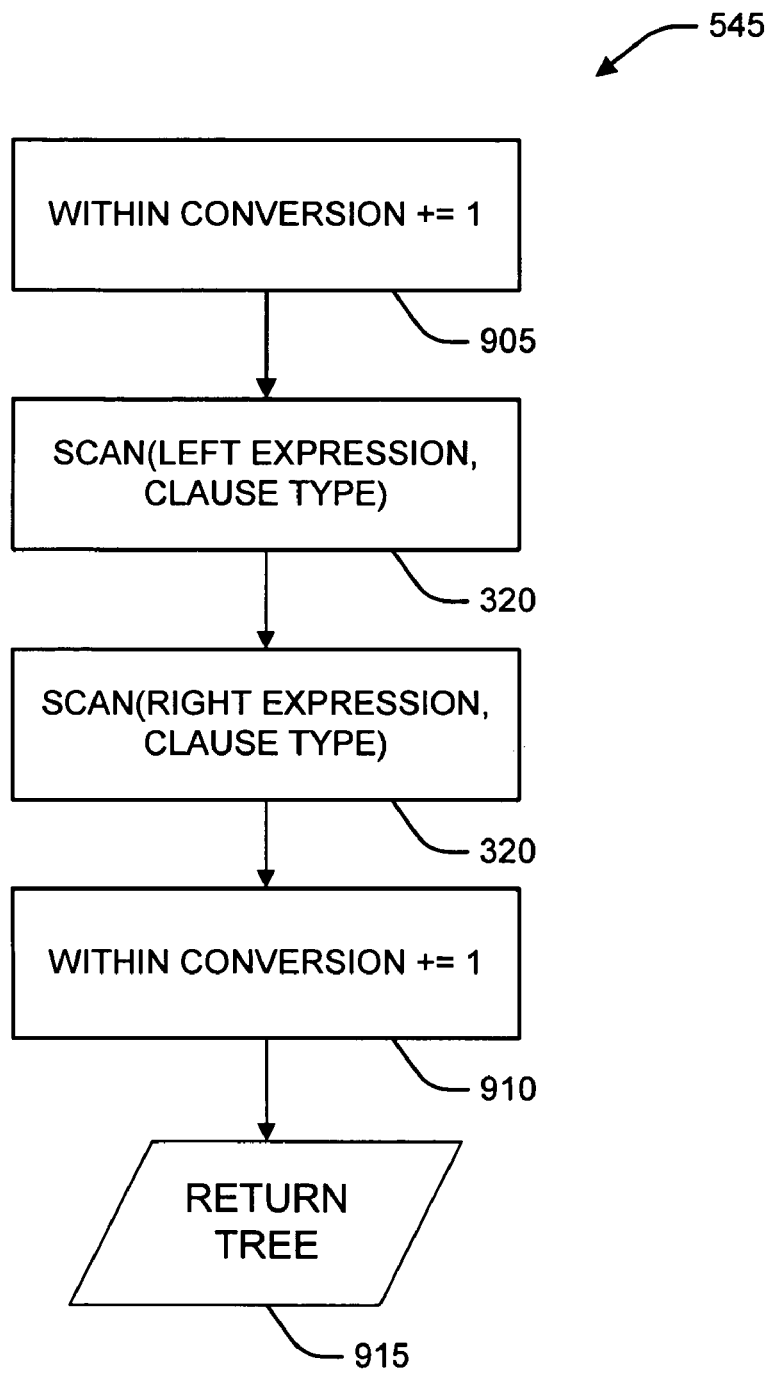

FIG. 9 shows an example system for scanning an alias clause (block 545). The system starts by incrementing the "WithinConv" count by one (block 905). As discussed with respect to FIG. 6, this variable allows the system to determine if the expression or sub-expression it is currently evaluating is within an alias clause. The system calls the scan function (block 320) and passes the left expression of the alias clause, represented by left child of the alias node and the child's descendants, and the clause type to the scan function. The system calls the scan function (block 320) again, and passes the right expression of the alias clause, represented by the right child of the alias node and the child's descendants, and the clause type to the scan function. The system then decrements the "WithinConv" count by one (block 910) and returns the tree (block 915).

Figure 10:
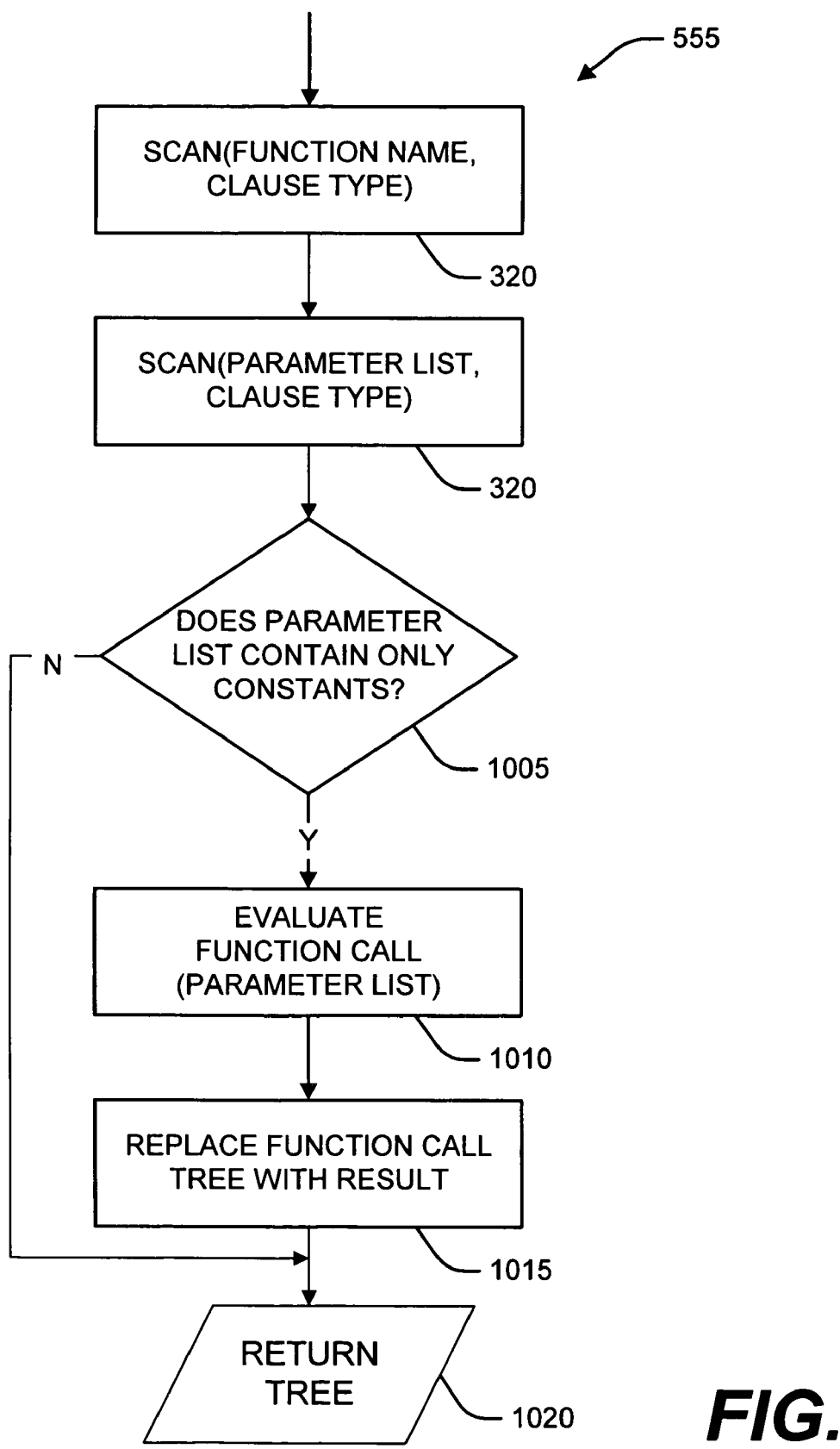

FIG. 10 shows an example system for scanning a function call expression (block 555). In one example system, function calls are represented in trees with a function call node at root. The function call node, in turn, includes at least two children, a function name node and a parameter list node. The function name node, in turn, has one or more child nodes representing the name of the function. The parameter list node, in turn, has one or more child nodes that represent the parameters passed to the function call.

If the function call is represented in the tree in the manner described above, the system calls the scan function (block 320) and passes the function name tree, (e.g., the function name node and its descendants) and the clause type to the scan function. The system then calls the scan function (block 320) again and passes the parameter list tree, (e.g., the parameter list node and its descendants) and the clause type to the scan function. The system then determines if the parameter list contains only constants (block 1005) and, if so, the system evaluates the function call for the values in the parameter list (block 1010) and replaces the function call tree with the result returned from the function call (block 1015). After block 1015, or if the parameter list does not contain only constants, the system returns the tree (block 1020).

An example algorithm for implementing the evaluation of the function call for the values in the parameter list (block 1010) is disclosed below. In the following procedure, Fname represents the function call, ParameterList represents the parameter list, and Ex_Exp executes the function. The procedure returns the value of the function call for the parameter list.

FUNCTION Eval(Fname,ParameterList):
BEGIN
    When Exp is equal to Fname→
    Return Ex_Exp(ParameterList);
END The scan function (block 320), discussed above helps the system walk though the SQL query to find expression that may be simplified. The system will also simplify expression once they are identified by the scan function (block 320). One such simplification has already been discussed: reducing function calls with parameter lists containing only constants to the value of the function call for the parameter list (block 555). Other example simplifications include:
1. $0*X=X*0=0$, if X is not nullable
2. $0/X=0$, if X is not nullable
3. $0 \bmod X=>0$, if X is not nullable
4. $1*X=X*1=>X$
5. $X/1=>X$
6. $0+X=X+0=>X$
7. $X-0=X$ Note that some of the example simplifications listed above are possible only if the column or variable cannot take a null. In one example system, the nullability of a variable or column in a database is determined by the definition of the column. For example, table ta1, defined above contains the following column definitions: "x1 INT NOT NULL, y1 INT, z1 INT." Based on these definitions column x1 is not nullable, while columns y1 and z1 are nullable.

Figure 11A:
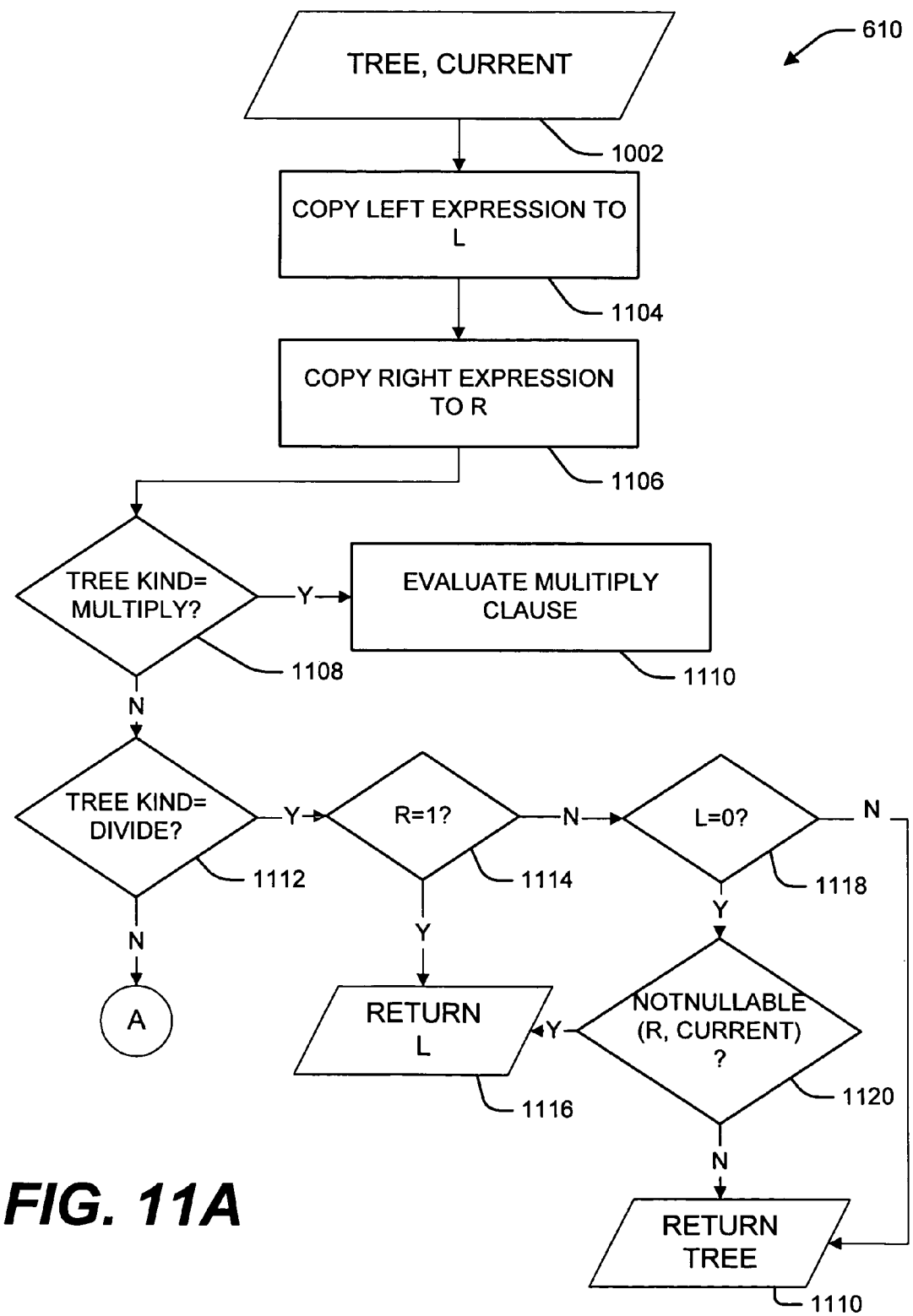
FIGS. 11A, 11B, and 12 are flow charts of a system for pruning expression in the SQL query.
Figure 11B:
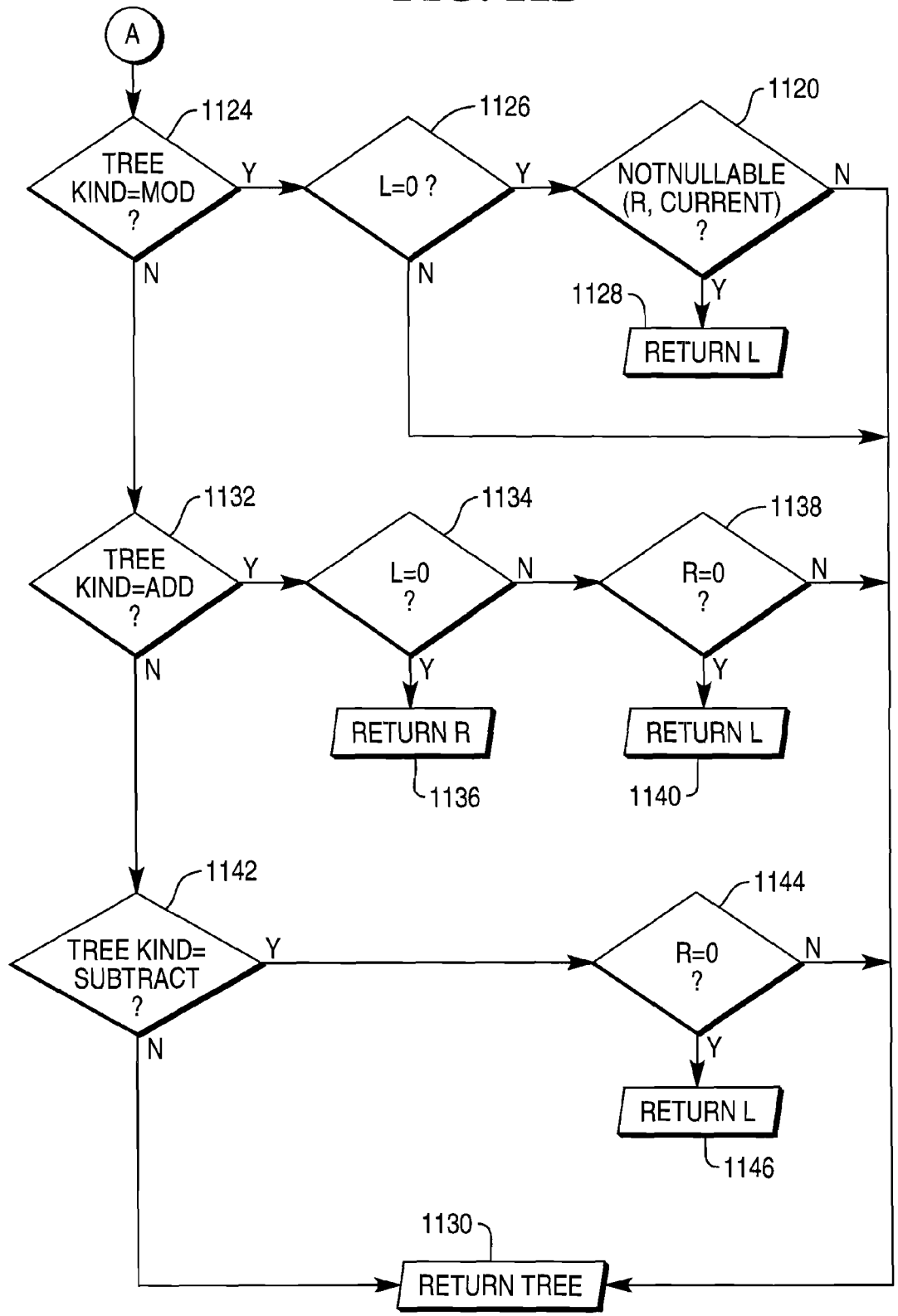

An example system for pruning expressions (block 610) is shown in FIGS. 11A and 11B. In FIG. 11A the system receives a tree and a "CurrentRet" variable (block 1102). The system copies the left expression (e.g., the tree formed by the left child of the root node and its descendants) to L (block 1104) and the right expression (e.g., the tree formed by the right child of the root node and its descendants) to R (block 1106). The system determines if the tree is a multiply tree (e.g., the root node of the tree is a multiply node) (block 1108) and, if so, the system evaluates the multiply expression (block 1110, which is shown in greater detail in FIG. 12).

An example algorithm for implementing the pruning system (block 610) is disclosed below. The CisNotNullable procedure is discussed in more detail below with an example computer algorithm. In the following procedure, T represents the expression, and CurrentRet represents the current SQL query. The procedure returns a tree representing the expression after simplification, if any.

```
FUNCTION ExpPrune(T, CurrentRet):
BEGIN
    Copy the left expression of T into L;
    Copy the right expression of T into R;
    When T's Kind is equal to ParMul=>
    If L is equal to 1 then—1*X=>X
        Return R;
    If R is equal to 1 then—X*1=>X
        Return L;
    If L is equal to 0 and CisNotNullable(R,CurrentRet) then
        Return L;—0*X=>0
    If R is equal to 0 and CisNotNullable(L,CurrentRet) then
        Return R;—X*0=>0
    When T's Kind is equal to ParDiv=>
    If R is equal to 1 then—X/1=>X
        Return L;
    If L is equal to 0 and CisNotNullable(R,CurrentRet) then
        Return L;—0/X=>0
    When T's Kind is equal to ParMod=>
    If L is equal to 0 and CisNotNullable(R,CurrentRet) then
        Return L;—0 Mod X=>0
    When T's Kind is equal to ParAdd=>
    If L is equal to 0 then—0+X=>X
        Return R;
    If R is equal to 0 then—X+0=>X
        Return L;
    When T's Kind is equal to ParSub=>
    If R is equal to 0 then—X-0=>X
        Return L;
    Return T;
END
```

Figure 12:
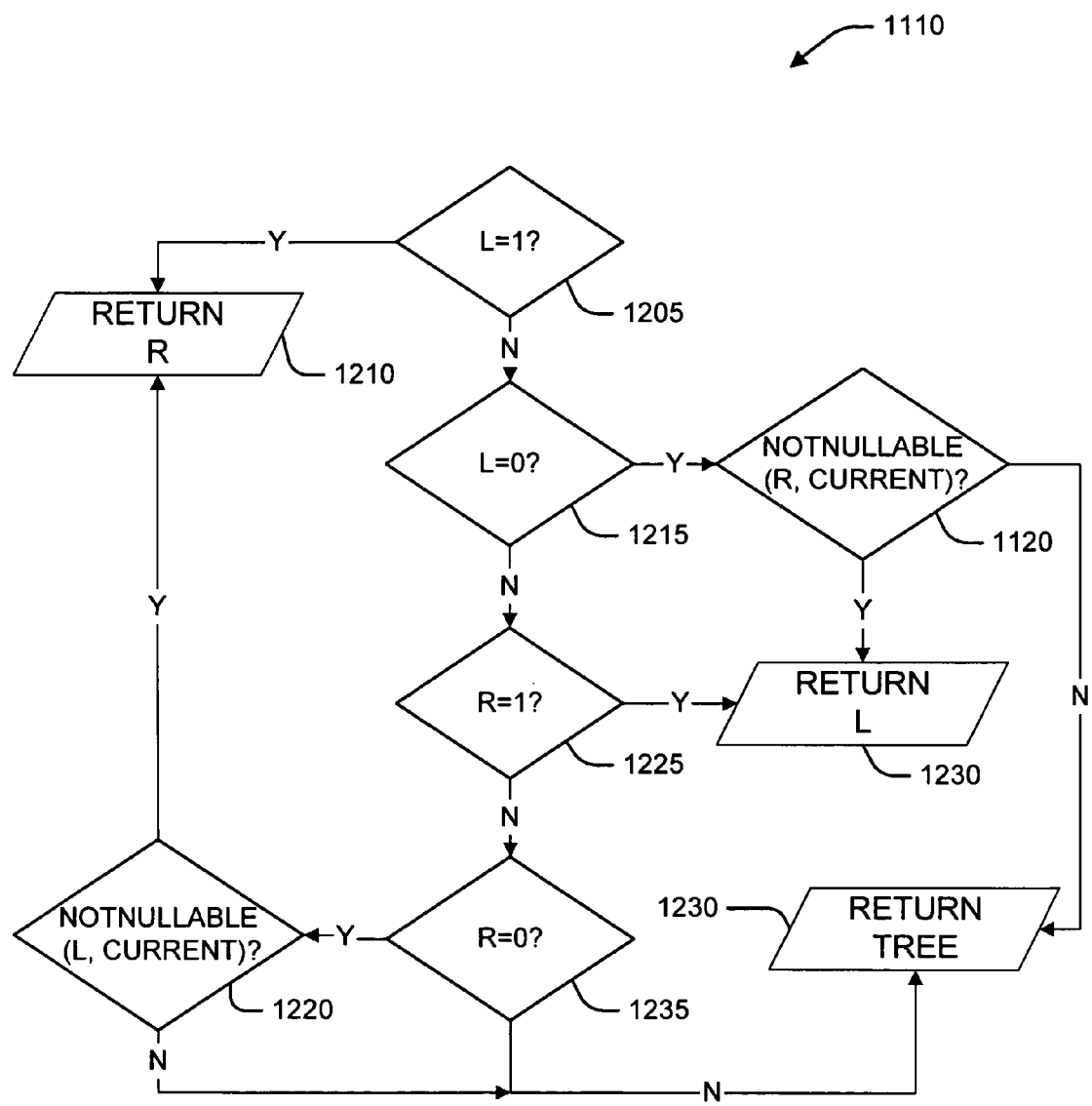

FIG. 12 shows an example system for pruning a multiplication expression (block 1110). The system determines if L is equal to "1" (e.g., 1*X=X) (block 1205) and, if so, returns R (block 1210). If L is not equal to "1," but L is equal to 0 (block 1215) and the not nullable function, passed R and "CurrentRet" as parameters, reports that R is not nullable (e.g., 0*X=0, if X is not nullable) (block 1120), the system returns L (block 1230). Otherwise, the system determines if R is equal to "1" (e.g., X*1=X) (block 1225) and, if so, the system returns L (block 1230). If R is not equal to "1," but R is equal to "0" and L is not nullable (block 1120) (e.g., X*0=0, if X is not nullable), the system returns R (block 1230). Otherwise the system returns the tree (block 1245).

Returning to FIG. 11A, in block 1112 the system determines if the tree is a divide tree (e.g., the root node of the tree is a divide node) and, if so, the system proceeds to block 1114, otherwise the system proceeds to block 1110 (which is shown in FIG. 11B). In block 1114, the system determines if R is equal to "1" (e.g., X/1=X) and, if so, the system returns L (block 1116), otherwise the system determines if L is equal to "0" (block 1118). If L is not equal to 0, the system returns the tree (block 1122). If L is equal to "0" the system then determines if R is not nullable by calling the not nullable function with parameters R and "CurrentRet" (block 1120). If R is nullable (e.g., the not nullable function returns "FALSE") the system returns the tree (block 1122), otherwise (e.g., the not nullable function returns "TRUE") the system returns L (e.g., 0/X=0, if X is not nullable) (block 1166).

Turning to FIG. 11B, the system determines if the tree is a modulo tree (e.g., the root node of the tree is a modulo node) (block 1124), and if so, tree the system proceeds to block 1126, otherwise the system proceeds to block 1132. In block 1126, the system determines if L is equal to "0" (block 1126) and, if so, the system determines if R is not nullable by calling the not nullable function with parameters R and "CurrentRet" (block 1120). If L is not equal to "0" or R is nullable (e.g., the not nullable function returned "FALSE"), the system returns the tree (block 1130). If, however, L is equal to "0" and R is not nullable (e.g., the not nullable function returned "TRUE") the system returns L (e.g., 0 MOD X=0, if X is not nullable) (block 1128).

In block 1132, the system determines if the tree is an addition tree (e.g., the root node of the tree is an addition node) (block 1132), and if so, tree the system proceeds to block 1134, otherwise the system proceeds to block 1142. In block 1134, the system determines if L is equal to "0" and, if so, the system returns R (e.g., 0+X=X) (block 1136). If L is not equal to "0" the system determines if R="0" (block 1138) and, if so, the system returns L (e.g., X+0=0) (block 1140), otherwise the system returns the tree (block 1130).

In block 1142, the system determines if the tree is a subtraction tree (e.g., the root node of the tree is a subtraction node) (block 1132), and if so, tree the system proceeds to block 1142, otherwise the system returns the tree (block 1130). If the tree is a subtract tree, the system determines if R is equal to "0" (block 1144), and if so, the system returns L (e.g., X−0=X) (block 1146), otherwise the system returns the tree (block 1130).

Figure 13:
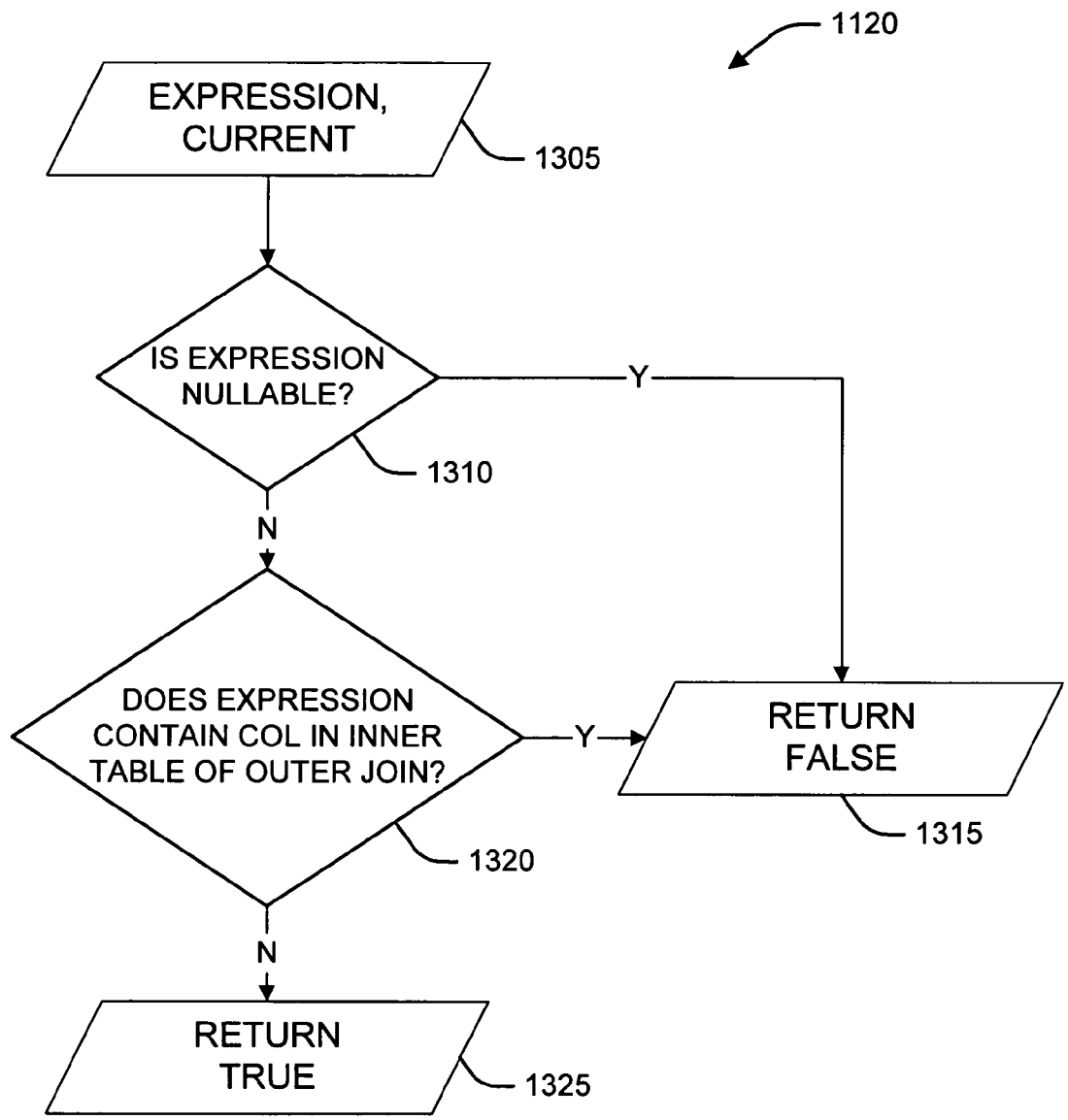
FIG. 13 is a flow chart of a system for determining if an expression is non-nullable.

FIG. 13 shows an example system for determining the nullability of an expression (block 1120). The system receives an expression and a variable "CurrentRet," allowing the function to determine the context of the expression in the SQL query (block 1305). The system determines if the expression is nullable (e.g., the expression contains one or more columns or variables that can take null values) (block 1310), and if so the system returns "FALSE" (block 1315).

Otherwise, the system determines if the expression contains one or more columns that are in an inner table of an outer join (block 1320), and if so the system returns "FALSE" (block 1315). Otherwise, if the expression is not nullable (block 1310) and does not contain a column in an inner table of an outer join (block 1320), the system returns "TRUE" (block 1325).

For examples of columns in inner tables of an outer join, reconsider these SQL statements:

CREATE TABLE ta1 (x1 INT NOT NULL, y1 INT, z1 INT);

CREATE TABLE ta2 (x2 INT NOT NULL, y2 INT NOT NULL, z2 INT NOT NULL);
SELECT x1 a, y1 b, 0*x1+0*y2 bb, z2*0 cc FROM ta1 LEFT OUTER JOIN ta2 ON x1=x2;

If the inner table in outer join constraint was no in place the sub-expression "0*y2" could be reduced to "0," because y2 is defined to be NOT NULL. However, table ta2 is the inner table of the outer join defined by "ta1 LEFT OUTER JOIN ta2 ON x1=x2." Therefore, because table ta2 is an inner table in an outer join and column y2 is in table ta2, column y2 is nullable.

An example algorithm for implementing the system for determining the nullability of the expression (block 1120) is disclosed below. In the following procedure, Exp represents the expression, and CurrentRet represents the current SQL query. The procedure returns a bool representing the non-nullability of the expression.

FUNCTION CisNotNullable(Exp,CurrentRet)
BEGIN
    If Exp is nullable then
    Return False;
    If Exp contains a column that belongs to an inner table of an outer join then
    Return False;
    Return True;
END Returning to FIG. 3, the scanning function 320 is placed after the data dictionary checker 315 because some of the expression simplifications performed by the system require that one or more columns are not nullable (e.g., $0*X=X*0=0$, $0/X=0$, and $0 \mod X => 0$). Therefore, the system must resolve the columns and variables so that the system can determine the nullability of the columns before these simplifications are performed. Other simplifications, however, that do not require the system to determine the non-nullability of columns (e.g., $1*X=X*1=X$, $X/1=X$, $0+X=X+0=>X$, $X-0=X$, and Function(Constants)=Return Value) may be performed before data dictionary checker 315 resolves the columns and variables. In some implementations, simplifications not requiring not-nullable checking are performed before the data dictionary checker 315, and the other simplifications are preformed after the data dictionary checker 315.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of processing a database query on a computer, the query including an expression, the method including:
    the computer performing expression optimization on the expression;
    the computer performing further query optimization to produce a result;
    the computer saving the result in a machine memory;
    the computer performing expression optimization before further query optimization; and
    where the expression includes a sub-expression ("SE"), and where the expression optimization includes:
        the computer representing the query as a tree structure;
        the computer representing the expression in the tree structure as a parent node having a first child node and a second child node;
        where the first child node represents the sub-expression;
        where the second child node represents the portion of the expression that is not the sub-expression; and
        where the parent node represents an operation between the first child node and the second child node;
    the computer determining that the second child node represents the constant 0 and that the parent node represents an arithmetic operation selected from the group consisting of addition and subtraction; and
    in response, the computer removing the parent node and its children from the tree structure and inserting the first child node in its place.

2. The method of claim 1, where the query includes an assignment list clause and where one or more of the expressions are in the assignment list clause.

3. The method of claim 1, where the query includes a WHERE clause, and where one or more of the expressions are in the WHERE clause.

4. The method of claim 1, where further query optimization includes:
    determining a satisfiability of the database query.

5. The method of claim 1, where further query optimization includes:
    determining a transitive closure of the database query.

6. The method of claim 1, where further query optimization includes:
    determining one or more plans for executing the query.

7. The method of claim 6, where one of the one or more plans includes:
    scanning a table to locate rows that satisfy one or more conditions; and
    summing one or more columns in the rows that satisfy the one or more conditions.

8. The method of claim 1, where further query optimization includes:
    selecting an optimal plan from executing the database query.

9. The method of claim 1, where further query optimization includes two or more optimizations selected from the group consisting of:
    determining a satisfiability of the database query;
    determining a transitive closure of the database query;
    determining one or more plans for executing the query; and
    selecting an optimal plan from executing the database query.

10. A computer program, stored on a tangible storage medium, for use in processing a database query, the query including an expression, the computer program including executable instructions that cause a computer to:
    perform expression optimization on the expression;
    perform further query optimization to produce a result;
    save the result in a machine memory;
    where the expression includes a sub-expression ("SE"), where expression optimization is performed before further query optimization, and where the computer program includes executable instructions that cause a computer to:
        represent the query as a tree structure;
        represent the expression in the tree structure as a parent node having a first child node and a second child node;
        where the first child node represents the sub-expression;
        where the second child node represents the portion of the expression that is not the sub-expression; and
        where the parent node represents an operation between the first child node and the second child node;
    determine that the second child node represents the constant 0 and that the parent node represents an arithmetic operation selected from the group consisting of addition and subtraction; and in response, remove the parent node and its children from the tree structure and insert the first child node in its place.

11. The computer program of claim 10, where the query includes an assignment list clause and where one or more of the expressions are in the assignment list clause.

12. The computer program of claim 10, where the query includes a WHERE clause, and where one or more of the expressions are in the WHERE clause.

13. The computer program of claim 10, where further query optimization includes:
determining a satisfiability of the database query.

14. The computer program of claim 10, where further query optimization includes:
determining a transitive closure of the database query.

15. The computer program of claim 10, where further query optimization includes:
determining one or more plans for executing the query.

16. The computer program of claim 15, where one of the one or more plans includes:
scanning a table to locate rows that satisfy one or more conditions; and
summing one or more columns in the rows that satisfy the one or more conditions.

17. The computer program of claim 10, where further query optimization includes:
selecting an optimal plan from executing the database query.

18. The computer program of claim 10, where further query optimization includes two or more optimizations selected from the group consisting of:
determining a satisfiability of the database query;
determining a transitive closure of the database query;
determining one or more plans for executing the query; and
selecting an optimal plan from executing the database query.

19. A database system including:
a massively parallel processing system including:
one or more nodes;
a plurality of CPUs, each of the one or more nodes providing access to one or more CPUs;
a plurality of data storage facilities each of the one or more CPUs providing access to one or more data storage facilities;
a computer program for execution on the massively parallel processing system for processing a database query, the query including an expression, the computer program including executable instructions that cause one or more of the CPUs to:
perform expression optimization on the expression;
perform further query optimization to produce a result;
save the result in a memory;
where the expression optimization is performed before the further query optimization; and
where the expression includes a sub-expression ("SE"), and where expression optimization includes:
representing the query as a tree structure;
representing the expression in the tree structure as a parent node having a first child node and a second child node;
where the first child node represents the sub-expression;
where the second child node represents the portion of the expression that is not the sub-expression; and
where the parent node represents an operation between the first child node and the second child node;
determining that the second child node represents the constant 0 and that the parent node represents an arithmetic operation selected from the group consisting of addition and subtraction; and
in response, removing the parent node and its children from the tree structure and inserting the first child node in its place.

20. The database system of claim 19, where the query includes an assignment list clause and where one or more of the expressions are in the assignment list clause.

21. The database system of claim 19, where the query includes a WHERE clause, and where one or more of the expressions are in the WHERE clause.

22. The database system of claim 19, where further query optimization includes:
determining a satisfiability of the database query.

23. The database system of claim 19, where further query optimization includes:
determining a transitive closure of the database query.

24. The database system of claim 19, where further query optimization includes:
determining one or more plans for executing the query.

25. The database system of claim 24, where one of the one or more plans includes:
scanning a table to locate rows that satisfy one or more conditions; and
summing one or more columns in the rows that satisfy the one or more conditions.

26. The database system of claim 19, where further query optimization includes:
selecting an optimal plan from executing the database query.

27. The database system of claim 19, where further query optimization includes two or more optimizations selected from the group consisting of:
determining a satisfiability of the database query;
determining a transitive closure of the database query;
determining one or more plans for executing the query; and
selecting an optimal plan from executing the database query.

* * * * *